United States Patent [19]

Wise

[11] Patent Number: 5,777,871
[45] Date of Patent: Jul. 7, 1998

[54] METHOD AND APPARATUS FOR COMPENSATION FOR OPERATOR IN A CLOSED-LOOP CONTROL SYSTEM

[75] Inventor: William L. Wise, P.O. Box 1382, Mountain View, Calif. 94042

[73] Assignee: William L. Wise, Mountain View, Calif.

[21] Appl. No.: 658,975

[22] Filed: Jun. 4, 1996

[51] Int. Cl.[6] .................................................. G05B 13/04
[52] U.S. Cl. ........................................................ 364/149
[58] Field of Search .................................. 364/148, 149, 364/424.07; 318/568.11, 568.1, 568.13; 73/35.03

[56] References Cited

U.S. PATENT DOCUMENTS

| | | | |
|---|---|---|---|
| 3,699,555 | 10/1972 | Du Vall | 360/78.06 |
| 3,967,176 | 6/1976 | Wagener et al. | 318/603 |
| 4,200,827 | 4/1980 | Oswald | 318/561 |
| 4,839,573 | 6/1989 | Wise | 318/615 |
| 5,313,395 | 5/1994 | Kawai et al. | 364/431.07 |
| 5,394,322 | 2/1995 | Hansen | 364/148 |

Primary Examiner—Reba I. Elmore
Assistant Examiner—McDieunel Marc
Attorney, Agent, or Firm—Townsend and Townsend and Crew LLP; Kenneth R. Allen

[57] ABSTRACT

Method and apparatus are provided for a Fly-By-Wire (FBW) Control System governing loop-gain (GH) for digital signal processing (DSP) compensation, and with analog compensation, both with and without pilot-input affects, so that aircraft FBW control provides high-fidelity pitch, roll, and yaw axis performance comparable to the 0% Step-Response-Overshoot (SRO) results achieved with open-loop pilot-input only, using conventional controls. The method and apparatus include true modeling of "active" pilot input, with frequency-domain transmission of time-delay times single pole response, as easily calibrated against a step disturbance to the loop-gain, GH, of interest. Both time-delay and single-pole response are given an operating range, applicable from very quick to relatively slow or tired pilots, where out-of-range pilot slowness eventually degrades the fidelity of the pitch, roll and yaw axis performance, albeit in a continuously predictable manner.

12 Claims, 11 Drawing Sheets

$$\vec{D}(s) = \frac{K_I}{S} \left[ \frac{(1 + \frac{S}{a_1})(1 + \frac{S}{a_2})}{\underbrace{\phantom{xxxxxxxxxxxxxxxxxxxxxxxxxxxxx}}_{F_{BW}}} \frac{(1 + \frac{S}{a_3})(1 + \frac{S}{a_4})}{(1 + \frac{S}{b})^4} \right]$$

$b = 0.3(2\pi f_s)$ $$\vec{D}(Z) = K \frac{(1 - e^{-a_1 T}Z^{-1})(1 - e^{-a_2 T}Z^{-1})(1 - e^{-a_3 T}Z^{-1})(1 - e^{-a_4 T}Z^{-1})}{(1 - Z^{-1})(1 - e^{-bT}Z^{-1})^4}$$

1

METHOD AND APPARATUS FOR COMPENSATION FOR OPERATOR IN A CLOSED-LOOP CONTROL SYSTEM

BACKGROUND OF THE INVENTION

This invention relates to feedback control systems and in particular to high-resolution and high-accuracy servo control systems wherein an operator optionally intervenes in the control process. The invention has particular application to digitized sampled-data servo control systems with digital sensing, control and processing elements employed in so-called fly-by-wire (FBW), or electronically-controlled, aircraft, as well as in electronically-controlled vehicles, robots, and the like.

Pilot-in-Loop effects on aircraft control, stability, and pitch/roll/yaw axis performance fidelity have been a major problem, worldwide, for known electronically controlled aircraft, and especially for high-agility fighter aircraft where pilot time-response (defined as the product of reaction time-delay and speed-of-response delay to a step change or perturbation to the loop) is approximately the aircraft's dynamic response-time. A number of crashes of experimental and operational aircraft are the tragic and costly results of this problem. It has been observed that this problem is especially acute when the affecting perturbations to the aircraft were approximately cyclic, such as during landing when speed of the aircraft is relatively low.

It is highly desirable to provide for high-fidelity performance (which equates to 0% step-response overshoot or SRO) in response to both given commands and to pilot input response to loop/axis disturbances. In conventional, open loop aircraft control systems, the aircraft's control follows the pilot-only input commands, essentially 1:1, with 0% SRO being the standard. The operation of such aircraft can be tiring for a pilot, and the control of complex systems is often imprecise, and since the pilot must supply required control surface efforts for all speeds and maneuvering. At the other extreme are fully automatic-pilot controlled aircraft, where pilot intervention is prevented altogether. In closed-loop FBW control systems, pilot intervention is permitted, but pilot "time-response" has been observed to increase Step Response Overshoot from the pilot's inherent "servo-chasing" to correct the control's intrinsically poor Step Response Overshoot (which is believed to be caused by insufficient phase margin designed into the system) which creates a negative phase contribution. This will occur for a control computer's changing commands, for pilot input which causes those changing commands and for outside perturbations such as wind gusts.

An example of how the problem of pilot intervention has been handled is the requirement that the U.S. F/A-18 C/D fighters employ "hands-off" carrier landing and take off, which requires a "leap of faith" on the part of the pilot. Even so, this "hands-off requirement is believed to be a cause of some of the publicly-reported crashes of this electronically-controlled aircraft. Other contemporary electronically-controlled fighters that have suffered similar pitch-axis "porpoising" crash landing are the Swedish JAS-39 Gripen and the U.S. YF-22 ATF. More recently, demonstrations of the Gripen and the EF2000 Eurofighter have been either of scale demonstration models or in extremely moderate flying conditions.

The text of J. M. Maciejowski, *Multivariable Feedback Design*, Addison-Wesley, 1989, is an example of current thinking about feedback systems. In particular, it represents that a loop phase margin of +45° is adequate for design. It is believed that this text promotes the same design assumptions and shortcuts which could well have led to performance limits on flights of the B-2 bomber due to step response overshoot (SRO) (See *Aviation Week*, Apr. 17, 1995, p. 49), observed "pilot-induced oscillations" in the Boeing 777 (*Aviation Week*, May 8, 1995, p. 32) and porpoising-induced crashes of the SAAB JAS-39 Gripen high agility fighter (Feb. 2, 1989 and Aug. 8, 1993) and of the US YF-22 high-agility fighter (Apr. 25, 1992). All of these reports are cause and effect examples of the dangers of potentially unstable operation modes.

Observations of high performance aircraft in occasional semi-oscillation have suggested that pilot input in response to observed aircraft attitude contributes loop negative phase in the electronic servo system which aggravates oscillatory behavior due to incorrect feedback control design. While labeled a pilot induced oscillation (PIO)—a less than accurate designation—it is believed that such problems are a result of incomplete and therefore less than adequate state-space and prior steady-state modeling, as well as a result of incorrect assumptions and/or ignorance of important factors, including the need to take into account the pilot time-response delay and pilot pole and the exact negative phase contributed by sampling-update delays. It is desirable to find a way to substantially eliminate the system step response overshoot effects of both pilot-time response and sampling update delays and loop effects.

SUMMARY OF THE INVENTION

According to the invention, in a servo-control system with electronic feedback (such as fly-by-wire or FBW) control, the operator effects, such as Pilot-in-Loop (PIL) effects, are time-domain accounted for as an initial time-delay in response to a change and then a time-reaction to that change. These effects are modeled as the product of a sinx/x-type time-delay times the reciprocal of a so-called "pilot-pole" in the frequency domain corresponding to the initial delay, for observation of the change, followed by a speed-of-response delay to that change, respectively. Further, according to the invention, a servo control system is designed with a seemingly excess phase-margin (PM) "budget," an intermittently switched-in zero at the geometric center of the center frequency of the intermittent "pilot pole," (whenever the pilot is actively using the controls), as well as sufficient gain-margin (GM) for all operating modes, including both switch-failure modes, so that both gain-margin and phase-margin for a full range of different types of pilots' response-time for "fly-by-wire" flight control will approximate conventional flight control without any need for further fine tuning. The same control mechanism can be used in ground vehicles and robots.

This servo design is accomplished by proper one-time fixed placement of available zeroes to cancel all plant poles below the set loop crossover frequency (FBW), as well as to cancel those plant poles just above the set loop crossover frequency, to the extent allowed, in context with (1) setting the lowest frequency zero at about 10% to 13% of the loop crossover frequency to provide the majority of the loop phase margin; (2) setting a reserved, switched-in, zero at the center of the pilot-pole range; (3) setting a reserved, fixed zero at three times the crossover frequency ($F_{BW}$); and as required, 4) moving the first zero which is above the loop-crossover frequency to lower frequency—possibly to below the loop-crossover frequency but not less than half the crossover frequency—to improve phase margin without unduly impacting on gain margin.

This modeling provides exact loop-gain magnitude and phase, rather than merely approximate loop-gain magnitude and phase and overcomes a root cause of the problem of low-fidelity performance of fly-by-wire systems, namely, inadequate loop-gain phase margin when the pilot is in the loop.

The invention overcomes a wide range of these pilot-response effects, enabling the achievement of 0% Step-Response-Overshoot (SRO) for responses of pilots with a range of reactions. By including the PIL terms within the applicable loop-gain (GH) equation, it will become apparent that the digital and analog control compensation required to provide the high fidelity, 0% SRO loop performance requires at least 6 zero/pole pairs to cover the normal range of pilots' speed-of-response to perceived changes. As a result of applying the design methodology of the present invention, aircraft FBW controls will very closely approach the 0% SRO pilot response of conventional, open-loop controls.

In a specific design example herein described, the 6 zero/pole pairs are distributed with four pairs in a digital microcontroller and two analog pairs within or close to the actuator plant subsystem. A 32-bit capability is required, which accommodates only four zero/pole pairs within a conventional digital controller as used in modern aircraft. An integrator is incorporated into the digital controller, together with its zero/pole pairs. Position control is employed. The sample frequency of the digital sampling (or data update frequency) is selected to be no lower than 20 times greater than the operational bandwidth of the closed loop so that the contributed negative phase of the sampling process is less than nine degrees (or $\pi/20$ radians).

The invention will be better understood by reference to the following detailed description in connection with the accompanying drawings.

DESCRIPTION OF SPECIFIC EMBODIMENTS

Figure 1:
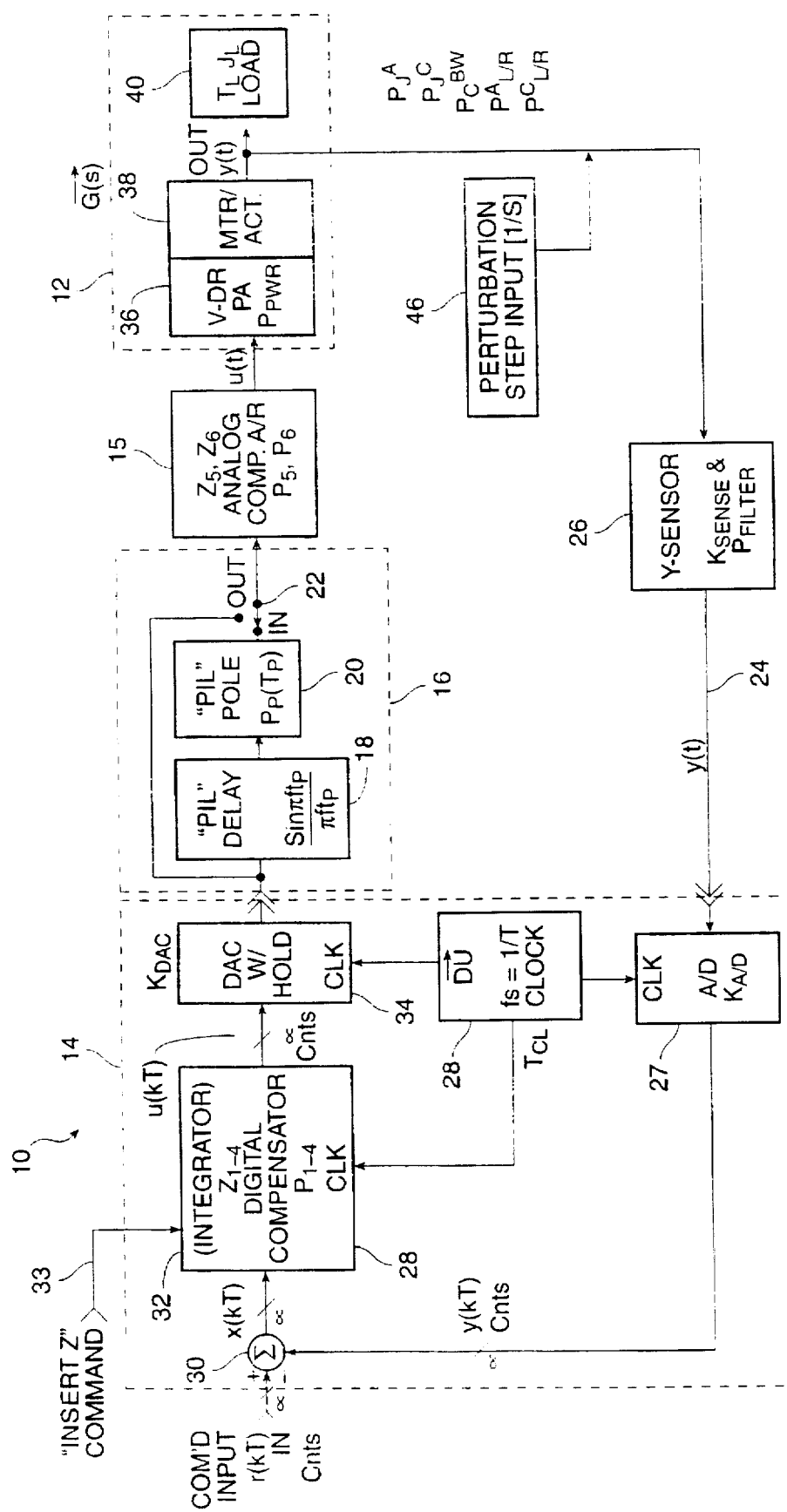
FIG. 1 is a block diagram of a servo control system with a load and an operator, or pilot-in-loop, according to the invention showing pilot effects with associated, in-concert, switched-in zero.

In order to understand the invention, it is helpful to understand the basic equations representing a servo control system.

The basic or system transmission equation for any negative feedback system is given by:

$$\frac{y(t)_o}{r(kT)_i} = \frac{1}{K_{FB}} * \frac{1}{(1 - 1/GH)} \quad (1)$$

where, in this invention, $y(t)_o$ is the output position as a function of continuous time t;

$r(kT)$ is the input position command as a function of discrete time kT indexed on k;

$K_{FB}$ is the overall time-dependent feedback gain for the feedback vector FB (expressed in magnitude and phase) expressed in counts per radian. It includes a sensor constant and a constant for the A to D converter with a pole pair (one $<P_s>$ of which is intrinsic in the feedback device but which is of such generally high frequency as to be irrelevant) and a high frequency "filter pole" $<P_f>$ to suppress noise into the controller related to the errors in the digitizing processes, noise pickup, etc. In other words, $$K_{FB} = K_{snsr} * K^{AD} * \frac{1}{<P_f><P_s>} \quad (2)$$

GH is the dimensionless frequency-dependent loop gain function vector, starting with a +180° phase budget modified by the sum of the positive phase contributions of the zeroes and the negative phase contributions of the poles. (It should be understood that GH is an inherently negative quantity which by convention becomes positive with 180° phase shift.)

The term GH is the parameter which is manipulated in a feedback control system, as will be explained in conjunction with FIG. 1 and Equation 3 below.

The basis of this invention is derived from frequency-domain analysis because of its precision and its ease in understanding and modeling real-world effects. For relatively low-frequency closed-loop systems with little high-frequency dynamic effects, such as robots, low-bandwidth aircraft, laser frequency regulators, the frequency-to-time domain conversion which is used in this invention, as set forth in Table I and illustrated in FIG. 2, has routinely proven to be sufficiently precise in all similar working high-performance/high-phase margin systems for all relevant real-world effects, no matter the number of poles, zeroes, delays and other transmission elements.

A zero $<Z>$ is a frequency-transmission expression which is a complex number always in the numerator of the loop equation. It is of the form $<1+jf/Z>$, where Z is the frequency of the zero. The magnitude and phase are given by the expression:

$$|1+(f/Z)^2|^{1/2} \text{ at phase angle } +\text{atan}(f/Z). \quad (A)$$

A zero causes a gain and phase response to increase with frequency above the zero at a positive unit slope change (i.e, at a marginal +6 dB/octave rate).

Similarly, a pole $<P>$ is a frequency transmission expression always in the denominator of the loop equation. It is also a complex number of the form <1+jf/P>, where P is the frequency of the pole. The magnitude and phase are given by the expression:

$$|[1+(f/P)^2]|^{1/2} \text{ at phase angle } -\text{atan}(f/P). \quad (B)$$

A pole causes a gain and phase response to decrease with frequency above the pole at a negative unit slope change (i.e. at a marginal –6 dB/octave rate). Using these expressions one can obtain exact magnitude and phase values at any frequency. Transmission through a zero and a pole at exactly the same frequency completely cancels, i.e. the transmission is a gain of 1.0 and a phase of 0°, which is equivalent to an electrical signal along a short piece of wire.

In frequency domain modeling, there is a correspondence between the continuous s-plane representation and the discrete z-plane representation. The mapping is effected by substitution according to the relation $z=e^{sT}$. The result is an approximation of the composite continuous transfer function D(s) in the form of difference equations representing the discrete time (digital) transfer function D(z) based on certain assumptions about what happens to e(t) between sample points.

The modeling in this invention is according to the Modified Matched Pole-Zero (MMPZ) methodology for approximating discrete-time functions, which requires one more pole than zeroes. MMPZ modeling allows a reasonable set of assumptions and simplifications to obtain difference equations and which allows feedback to be based on a discrete value which has actually been measured in the past which at the same time has a response which rolls off with frequency, both of which are real-life limitations. In a difference equation based on a MMPZ model, an entire sample period is available to perform each calculation and provide an output. A discrete analysis of an MMPZ model of a controller gives a relatively accurate picture of the behavior of a real system so that impact of individual components can be more accurately understood, which in this invention means that the PIL in the context of the full closed-loop system can be accurately modeled and accounted for.

In summary, the MMPZ model is as follows: define the continuous model (in the f- or s-plane) with every block having one more pole than zero; map poles and zeroes between the s-plane and the z-plane according to the relation $z=e^{sT}$; set the index of e in discrete time to one interval less than the output [i.e. e(k−1)]. This is equivalent to setting $1/s=(1-z^{-1})$ In this way the continuous compensation function D(s) can be mapped to a discrete compensation function D(z), which allows the compensation function to be represented in simple difference equations without using the term x(n) in the conventional expression for the difference equation.

Referring to FIG. 1, there is shown a block diagram of a servo control system 10 according to the invention expressed in MMPZ format. The system 10 is described for position control, but it can be modified for rate control. The system 10 has a command input r(kT), a plant 12, a digital controller 14, an analog controller 15, and an intermittent operator in the loop or "pilot in loop" (PIL) 16, which has a specific impact on operation of the loop. According to the invention, the PIL 16 is modeled as a PIL delay 18 (in the form of sin [πfτ]/πfτ) at −πfτ° representing an observation delay in series with a pilot pole 20, which is intermittently inserted in the forward path of the loop via a PIL "switch" 22. The main feedback loop carries 24 the position signal or y(t) output value as sensed via a y(t) sensor 26. The PIL 16 is inserted whenever the pilot intervenes in control. Otherwise the PIL 16 is out of the loop.

In the controller 14 there is an analog-to-digital (A/D) converter 27 which receives as input the continuous (analog) plant feedback signal y(t). It is modeled by the feedback term $K_{A/D}$. It is driven by a sampling clock 28 to produce a data update signal modeled as a delay, herein DU having a sampling frequency $f_s=1/T$, to produce a discrete feedback term y(kT) to a summer 30 which is received at a nominal 180° out of phase with the command input of r(kT) in order to subtract from the command input and drive the error position α in counts to zero.

The discrete time command input r(kT) and the feedback term y(kT) are therefore in common terms (such as counts corresponding to position), each of equal resolution of α bits. The summed (difference) output x(kT) is a position error signal of α bits resolution. The value x(kT) is provided as input to a digital compensator 32 in which the discrete compensation function D(z) is implemented as hereinafter explained based on a model analyzed as a continuous compensation function D(s). The compensation function output u(kT) is provided to a digital to analog converter (DAC) 34 having a built-in high speed sample and hold. The DAC 34, as well as the digital controller 32, is synchronized by the sampling data update clock 28. The PIL delay 18 and PIL pole are effectively insertable at this point in the forward path by means of the PIL switch 22 and ahead of the analog compensator 15. The output of the analog compensator 15, which introduces two zero/pole pairs in the forward path $Z_5$, and $Z_6$ (with $P_5$ and $P_6$) to produce the continuous, but stepped position correction signal u(t) to drive the plant 12.

Within the plant 12 is a power amplifier 36 coupled to excite a motor/actuator 38 which produces the position signal y(t) which drives the torque and inertial load 40, such as the control surfaces of an aircraft.

The load is modeled by torque $T_L$ and inertia $J_L$. Based on the response characteristics of the plant, the poles representing inertia can be identified. In a high performance aircraft system having a canard, for example, there are five systemic or plant poles which must be accounted for, plus an intermittent PIL pole for each axis. There is an aircraft inertia pole $P^A_J$ which is the combined motor/actuator/aircraft load inertia. There is a canard inertia pole $P^C_J$ which is the reflected inertia from the canard. There is an aircraft electrical pole $P^A_{L/R}$ which is the inductive/resistive pole as modified by the current loop 42. There is the filter pole $P_f$ which is the filter pole previously discussed. And there is a canard bandwidth pole $P^C_{BW}$ which is the high frequency limitation pole as reflected from the canard.

It is to be noted that the inertia poles need to be compensated for to prevent limit cycling. The compensation can be an "inertia-chasing" zero added to the digital controller as hereinafter explained. (The paired pole is also added at very high frequency, i.e., at 0.3 the sampling frequency.)

A major contributor to the problem of instability is intermittent perturbations 46, which can be modeled as a step change in either of two directions. The perturbation, which is an effect felt at the load can be modeled as a 1/s input directly to the feedback loop. The other contributor of instability is the pilot. The pilot pole 20 is modeled as explained below, with the pilot observation delay modeled as a delay in the form of (sin x)/x, where $x=\pi f\tau_D$. (It is completely analogous to the data update clock 28, except that it is a substantially longer delay.)

The loop-gain vector GH(s) represents the system 10. For the ease of modeling, s is set to jω or j2πf, which allows the model to be expressed in the frequency domain. When the digital compensator has been completed (designed) within the frequency (f) domain, the compensation function is then transformed directly back to D(s) in the continuous time domain, and then the compensation function D(z) is synthesized all using the MMPZ approximation in the discrete time frequency domain or "z" domain.

Following from equation (1), in a system without an intermittent PIL, the loop gain function is:

$$GH(f) = \{DU\} * |D(f)| * |Q(f)| \tag{3}$$

where

Q(f) is the plant transmission function of the loop without the pilot in loop, which is:

$$Q(f) = K^{DAC} * G_{analog} * G(f) * K_{FB} = y(kT)/u(kT) \tag{4}$$

{DU} is the delay update sample clock in the form $$\{|(\sin \pi f \tau_{CLK})/(\pi f \tau_{CLK})| \text{ at } -180° f \tau_{CLK}\} \tag{5}$$

which is fixed;

D(f) is the compensation function (in f), which includes an added integrator $|K_i/(j2\pi f)|$ separate from pole/zero pairs of the MMPZ form;

G(f) is the plant-power amplifier, motor, load subsystem given by:

$$G(f) = \frac{K_{mtr}}{j2\pi f} * K_{PA} \frac{1}{<P_x>^n} \frac{1}{<P_{L/R}^A>} \frac{1}{<P_{PA}>} \tag{6}$$

where $K_{mtr}$ is the motor gain.

$K^{DAC}$ is the DAC gain.

$K^{AD}$ is the ADC gain.

$K^{PA}$ is the power amplifier gain.

$P_X$ is the set of plant poles reflected from the load, including load and motor inertia $P_j^A$, canard inertia $P_j^C$, and canard bandwidth $P_{BW}$ $P_{L/R}$ is the inductance/resistance electrical time constant pole (A)

$P_{PA}$ is a power amplifier (bandwidth) pole.

Similarly, in a system with an intermittent PIL:

$$GH(f) = \{DU\} * \{PIL\} * \frac{1}{[P_p]} * |D(f)| * |Q(f)| \tag{7}$$

where

{PIL} is the intermittent pilot observation delay within a preselected modeled range, in the form:

$$\{|(\sin \pi f \tau_D)/(\pi f \tau_D)| \text{ at } -180° f \tau_D\}, \tag{7a}$$

which is variable, and $<P_p>$ is the associated intermittent pilot pole within a preselected or modeled range, which is also variable.

As explained with respect to Equations (A) and (B), poles are expressed as $<P_i>$ which is a shorthand expression for the complex number $<1+jf/p_i>$, where $p_i$ is the pole-set frequency. Similarly, zeroes are expressed as $<Z_i>$ which is the shorthand expression for the complex number $<1+jf/z_i>$ where $z_i$ is the zero-set frequency.

The loop-gain-function vector GH can be analyzed in terms of all poles, all zeroes, all delay functions, and every other in-loop block transmission. It has been discovered that proper control over undesired step response overshoot (SRO) can be rigorously and precisely controlled by proper budgeting of the available phase margin in the feedback control system, no matter how many zeroes and poles there are in a system. In any feedback control system, there is initially +180° of available phase margin. Use of an integrator and/or a velocity-based actuator in a positioning mode causes immediate loss of 90° for the integrator and 90° for the actuator. It is necessary to add zeroes to "reimburse" the phase budget to attain adequate control over SRO. Taking into account that each pole decreases or subtracts from available phase margin budget (by the arctangent of the crossover frequency divided by the frequency of the pole), and that each zero increases the phase margin in the same manner, it can be seen that the addition of relatively low-frequency zeroes (with paired, high-frequency poles, at or below (1) 0.3 of the sampling or data update frequency for digital compensators, and (2) less than ten times the frequency of the set zeroes, for analog compensators) adds to the phase margin with minimal effect by the paired poles and contributes needed phase margin to permit the precise control over Step Response Overshoot for a given loop set bandwidth without sacrificing the loop bandwidth and thus not sacrificing agility. According to the invention, precise control of Step Response Overshoot by phase margin control (as shown in Table I) assures that the system fidelity as well as the pre-set agility for the given bandwidth is always maintained such that step-response never becomes of any concern to the pilot, much less in any way oscillatory.

Figure 2:
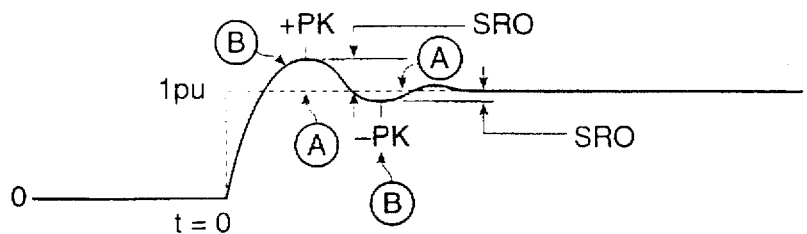
FIG. 2 is a timing diagram illustrating step response overshoot for two different phase margins in a servo control system.

Referring to Table I in connection with FIG. 2, there is shown the SRO in the form of positive phase margin $+\phi_m$ (or PM) in relationship to first peak step response overshoot +PK (positive peak) and the second peak step response undershoot −PK (negative peak) as a function of time. There is no methodology limitation on the number of poles, zeroes, delays or any other frequency domain transmission elements in a system capable of maintaining the limit on step response overshoot. (Systems with as many as forty-five total in-loop poles-and-zones have been successfully designed and implemented.) Trace A shows the SRO for a 72° phase margin and trace B shows the SRO for a 30° phase margin for systems of identical bandwidth. It is to be noted that the loop rise-time at the initial step response is approximately the same for both traces, but Trace A has no perceptible overshoot, an extremely desirable result.

TABLE I

| | $+\phi_m$ (°) | ξ Damping Multiplier | SRO % Pos. Peak | SRO % Neg. Peak |
|---|---|---|---|---|
| | 75 | .949,127 | 75.66 PPM | X |
| | 74.5 | .932,033 | 309.6 PPM | X |
| | 74 | .915,467 | 787.0 PPM | 0.619 PPM |
| | 73.5 | .899,572 | 0.154,9 | 2.398 PPM |
| | 73 | .884,298 | 0.260,6 | 6.792 PPM |
| | 72.5 | .869,598 | 0.395,5 | 15.64 PPM |
| A | 72 | .855,431 | 0.557,8 | 31.12 PPM |
| | 71 | .828,551 | 0.957,2 | 91.63 PPM |
| | 70 | .803,397 | 1.443 | 208.1 PPM |
| | 69 | .779,753 | 1.999 | 399.5 PPM |
| | 68 | .757,440 | 2.613 | 682.9 PPM |
| | 67 | .736,304 | 3.276 | 0.107,3 |
| | 66 | .716,215 | 3.979 | 0.158,3 |
| | 65 | .697,062 | 4.716 | 0.222,4 |
| | 64 | .678,749 | 5.482 | 0.300,6 |
| | 63 | .661,192 | 6.274 | 0.393,6 |
| | 62 | .644,318 | 7.088 | 0.502,3 |
| | 61 | .628,064 | 7.921 | 0.627,5 |
| | 60 | .612,372 | 8.773 | 0.769,7 |
| | 58 | .582,486 | 10.526 | 1.108 |
| | 56 | .554,324 | 12.340 | 1.523 |
| | 54 | .527,616 | 14.210 | 2.019 |
| | 52 | .502,147 | 16.135 | 2.603 |
| | 50 | .477,739 | 18.115 | 3.282 |

TABLE I-continued

|  | $+\phi_m$ (°) | ξ Damping Multiplier | SRO % Pos. Peak | SRO % Neg. Peak |
|---|---|---|---|---|
|   | 45 | .420,448 | 23.321 | 5.439 |
|   | 40 | .367,207 | 28.931 | 8.370 |
|   | 35 | .316,869 | 35.009 | 12.257 |
| B | 30 | .268,643 | 41.637 | 17.337 |
|   | 25 | .221,963 | 48.912 | 23.923 |
|   | 20 | .176,412 | 56.947 | 32.430 |

Figure 3:
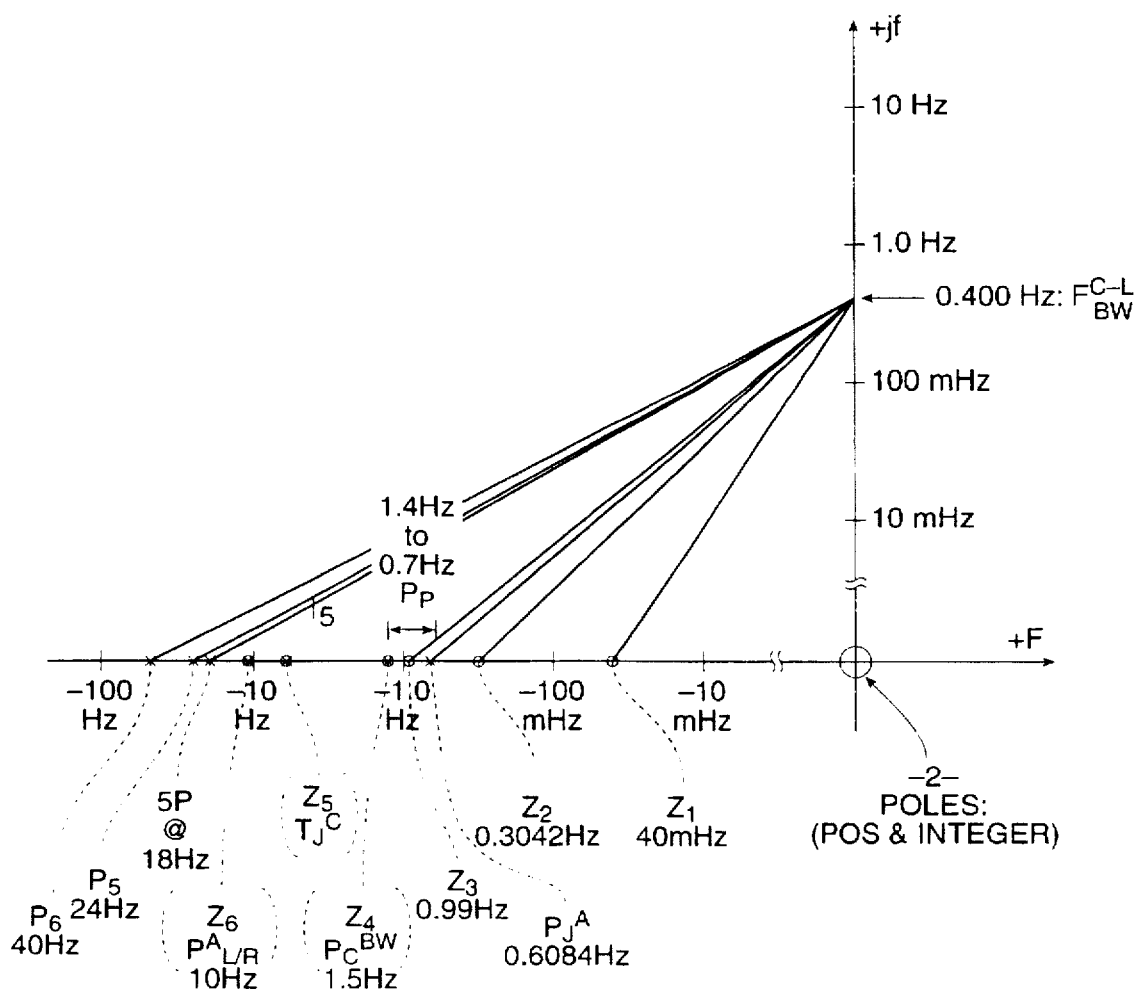
FIG. 3 is a pole-zero s-plane diagram of all loop-gain poles and zeroes, including compensator, of the invention.

The plant and compensator expression for the invention, expanded from Equation 7, is given by the following equation and illustrated in FIG. 3 (which does not illustrate data-update and delay functions), as a pole-zero f-plane diagram of all loop-gain poles and zeroes, including both digital and analog compensators:

$$GH(f) = (K_o/f)^2 * \{DU\} * \{PIL\} * \frac{<Z_1><Z_2> \quad <Z_3><Z_4> \quad <Z_5> \quad <Z_6>}{<P_f^A><P_p><P_{BW}^C><P_J^C><P_{L/R}^A><P>^5<P_5><P_6>} \quad (8)$$

$$\hat{F}_{BW}$$

where $K_o$ is the consolidated constant which can be used to set crossover frequency. In FIG. 3 and Equation 8, the poles and zeroes are listed from lowest to highest frequency to illustrate how they might cancel. The first inserted zero is preferentially at 0.1 of the crossover frequency, which gives 84° of phase budget. The crossover frequency is set at 0.4 Hz, so the first inserted zero is set at 0.04 Hz. The position of the crossover frequency $F_{BW}$ is graphically illustrated. The zero $<Z_3>$ is automatically and deliberately introduced when the PIL pole $<P_p>$ is inserted. According to the invention, this may be done, for instance, by sensing through one or more sensors on the pilot's controls whenever the pilot has hands/feet on the controls and then sending an "insert $<Z>$" command via signal line 33 to the digital compensator 32 (FIG. 1) causing it to insert the zero in its control software.

The magnitude of the vector GH(f) is given by $$= |K_o/f|^2 * \frac{|DU|*|PIL|*|Z_1|*|Z_2|*|Z_3|*|Z_4|*|Z_5|*|Z_6|}{|P_f^A|*|P_p|*|P_{BW}^C|*|P_J^C|*|P_{L/R}^A|*|P|^5*|P_5|*|P_6|} \quad (8a)$$

The "phase margin" "PM", calculated at any frequency, for Equation (8) is given in degrees and begins with zero net degrees from which the phase of the DU and the optional PIL are subtracted and the arctangent or phase of the sum of the twelve poles is subtracted and the arctangent or phase of the sume of six zeroes is added. True phase margin PM is calculated at the crossover frequency only, where |GH|= 1.000.

Referring to the diagram of FIG. 3, the elements are ordered in frequency to correspond with the order in Equation 8. It is extremely helpful in design to use a notation where both the order and relative position of the poles and zeroes are illustrated, so the designer can quickly visualize the gain-frequency characteristic of the compensated system. At the origin there are two (unlabeled) poles which cannot be removed: the pole of the computer integrator (from the compensator) and the motor position pole, which together have the effect of subtracting 90°+90°=180° from the phase budget, leaving a net 0° phase margin at frequencies well below the first zero. The next pole is the inertia pole $P_J^A$ of the aircraft above the crossover frequency. This is the first of the so-called plant pole or reflected pole from the load. This pole is followed by the intermittent and variable pilot pole $P_p$, which has been identified according to the invention. Next are the other reflected poles, the bandwidth pole of the canard $P^C_{BW}$, the inertia pole of the canard $P_J^C$, the inductance/resistance pole of the aircraft axis $P^A_{L/R}$, and five poles set at about 0.3 of the sampling frequency of 60 Hz (for example 18 Hz), along with the filter pole $P_f$ (A canard L/R pole $P^C_{L/R}$ is present but can be ignored because it is above 60 Hz.) Thereafter there are two analog poles, $P_5$ at 24 Hz paired to the zero at ¼ its frequency, and $P_6$ at 40 Hz paired to the zero at ¼ its frequency. Other poles are at such high frequency as to be irrelevant (e.g., above 10 kHz for the operational amplifiers of the system).

The second low frequency zero $Z_2$ is set to offset the inertia pole $P_J^A$ set at ½ the pole frequency. The third zero $Z_3$ is introduced whenever the pilot pole is present and is roughly centered on the pilot pole $P_p$ in order to cancel it. The fourth zero $Z_4$ is set to cancel the canard bandwidth pole $P^C_{BW}$ at 1.5 Hz. Thereafter the poles and zeroes alternate or cancel with zeroes at the lower frequency to the exhaustion of the zero budget. The key of the invention is to optimize both the gain-margin and the all-important phase-margin to prevent undesired Step Response Overshoot which could cause unacceptable system response errors, including pilot "servo-chasing" response.

Figure 4:
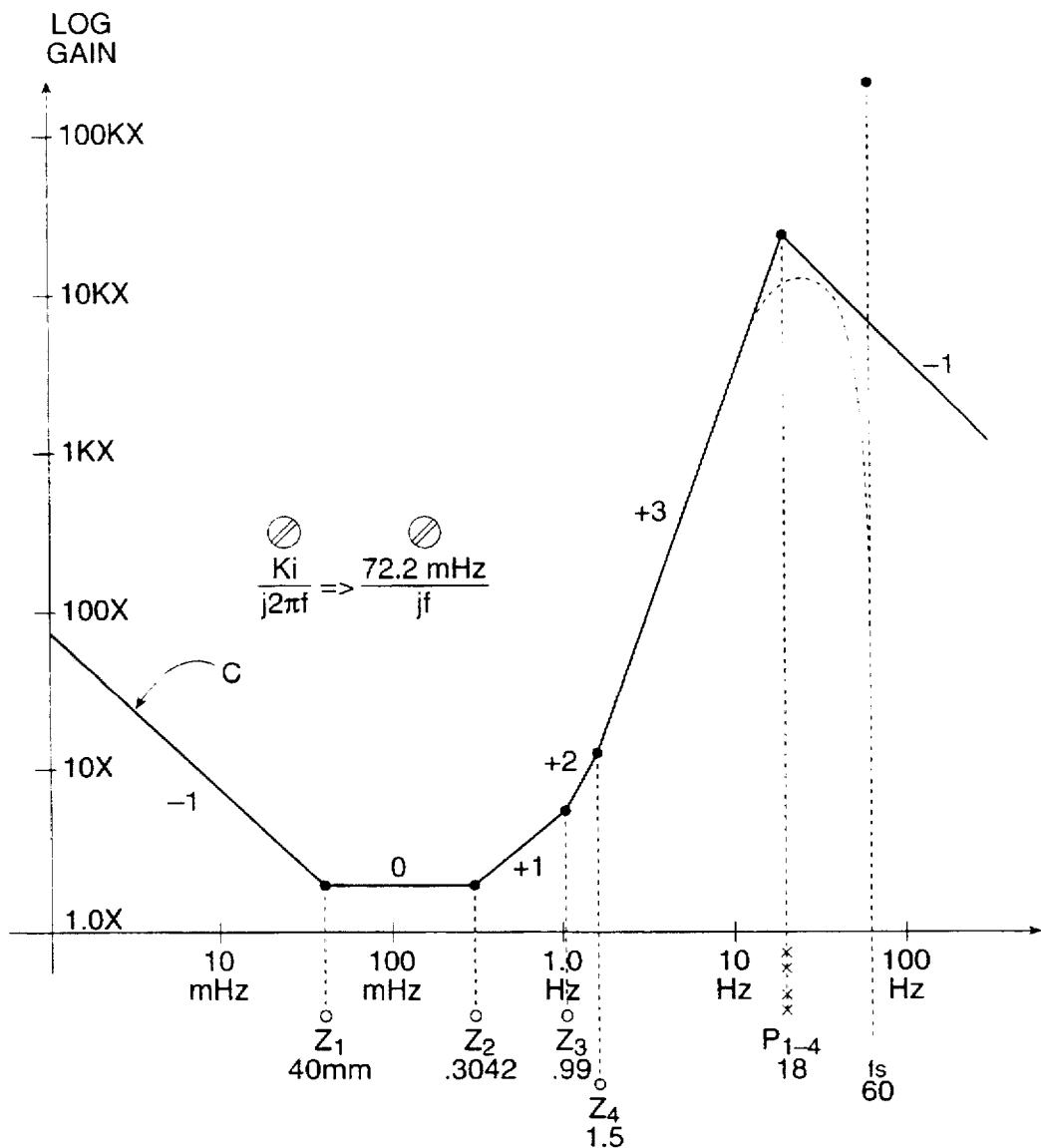
FIG. 4 is a gain-frequency diagram of the digital controller according to the invention which is used to produce the desired high phase margin.

FIG. 4 is a gain-frequency diagram in log-log form of the digital compensator 32 according to the invention. It is designed based on the system pole-zero configuration as diagramed in FIG. 3. The trace C is the low frequency integrator gain D(f) versus frequency. (Note the conversion is D(s)=D(j2πf). The conversion is made for convenience of frequency domain calculations.) The first zero is used to suppress the pole related to the integrator, which produces a negative 1 (−1) gain vs. frequency slope from a 1 milliHerz gain of 72.2, which fits the conditions to give a gain crossover of the main loop of 400 mHz. This gain crossover is set by selecting a gain $K_i$ after all zeroes and paired poles are set up according to the method of the invention. The sampling frequency $f_s$ is assumed to be at 60 Hz, and the four paired poles for all the added digital zeroes are set as high as possible without being impacted by the sampling frequency, from MMPZ boundary conditions. Thus the poles are set at 18 Hz, or at 0.3 times the sampling frequency.

Figures 5A, 5B, 5C:
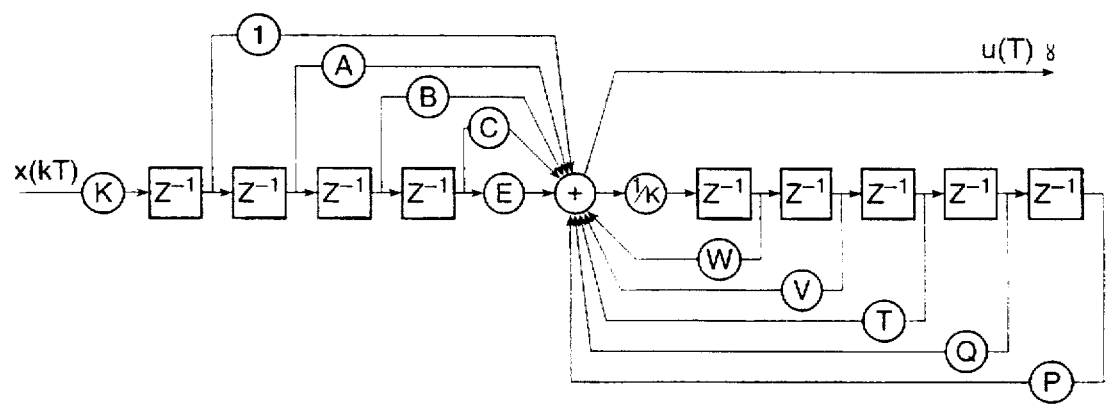
FIG. 5a is a representation of a digital compensation unit according to the invention as a D(s).
FIG. 5b is a representation of a digital compensation unit according to the invention as a D(z).
FIG. 5c is a block diagram of a direct form implementation of the compensation unit according to the invention.

FIG. 5a is a representation of the expression for D(s) which is preferably implemented in a DSP unit of a digital compensator 32 specific to this example according to the invention. It implements two low frequency zeroes at frequencies $a_1$, and $a_2$ (in radians), two mid frequency zeroes above the crossover frequency at $F_{BW}$ given by frequencies $a_3$ and $a_4$ (in radians), which are all paired with corresponding high frequencies poles at frequency b, where b is set to 0.3(2π) of the sampling frequency $f_s$ of the sampled data system. The term $K_I$ is an adjustable gain to set the bandwidth, the term which is set last and then fixed in the design. The vector D is expressed as counts per count, a gain.

A representation of the corresponding expression for D(z), which is the z-domain implementation of the digital compensator 32. By substituting the term $(z-e^{-aT}z^{-1})$ for the term (1+s/a), the expression for the digital compensator is obtained. Multiplying out the expression yields a polynomial whose coefficients become the later basis of a difference equation which is easily implemented in a digital controller, namely:

$$D(z) = \frac{K(1 - Az^{-1} + Bz^{-2} + Cz^{-3} + Ez^{-4})}{(1 - Wz^{-1} + Vz^{-2} + Tz^{-3} + Qz^{-4} + Pz^{-5})} \quad (9)$$

$$\text{where } K = K_I \left[ \frac{(1-e^{-bT})^4}{(1-e^{-a1T})(1-e^{-a2T})(1-e^{-a3T})(1-e^{-a4T})} \right] \quad (10)$$

and A, B, C, E, W, V, T, Q and P are the coefficients obtained by multiplying out the terms from the expression in FIG. 5b and deleting a low-frequency zero which effectively cancels the term for x(n) in these types of applications.

The difference equation is represented by the expression based on standard MMPZ format as:

$$u(n)=Wu(n-1)-Vu(n-2)+Tu(n-3)-Qu(n-4)+Pu(n-31\ 5)+K[-Ax(n-1)+Bx(n-2)-Cx(n-3)+Ex(n-4)]. \quad (11)$$

An analysis of the resolution, gain and frequency range of the equation is necessary to make sure the digital compensator is capable of providing proper range. For a typical system, the number of bits of digital resolution required in the compensator is at least 30 bits.

Other implementations, such as direct form digital delay implementations as are known in the art may also be employed. FIG. 5c depicts a direct form implementation of the digital compensator of Equation 9.

Figure 6:
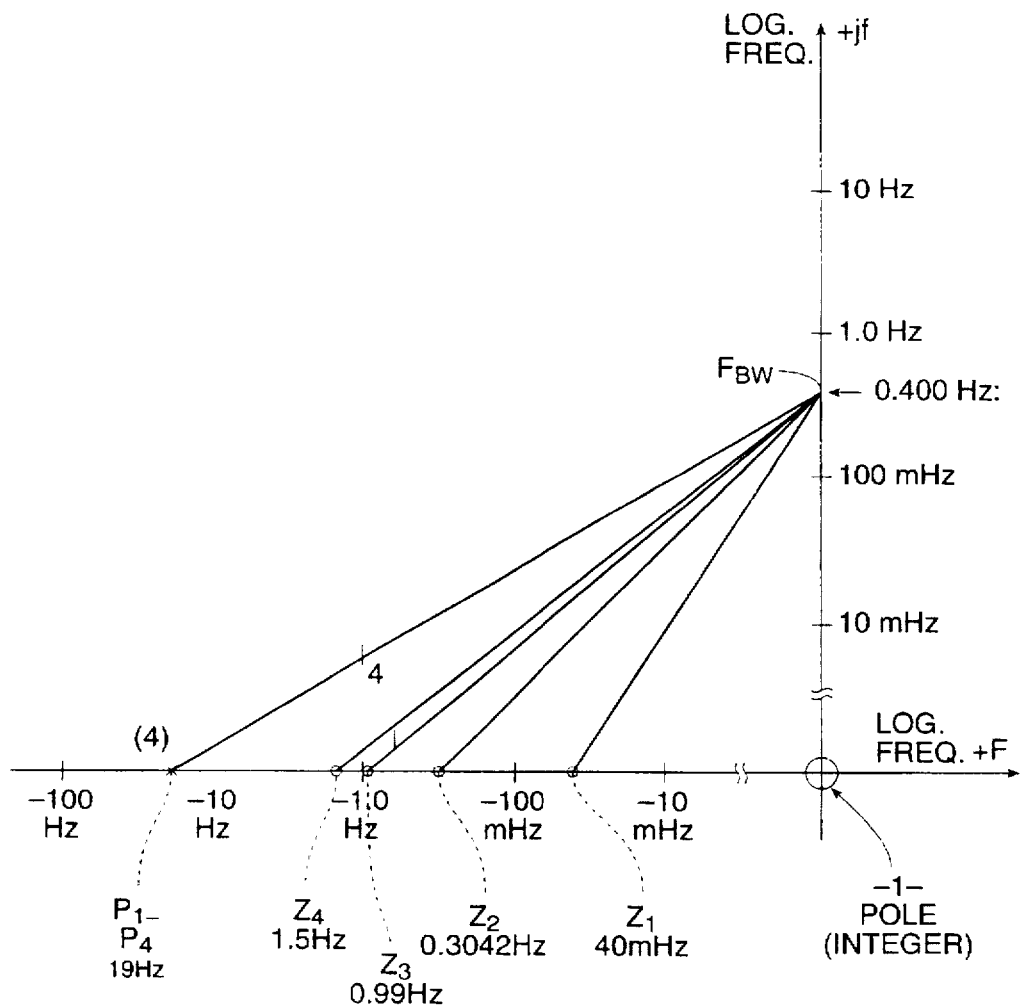
FIG. 6 is a complex frequency-domain (s-plane) diagram of the poles and zeroes of the digital controller and analog controller, as required, according to the invention which produces the gain-frequency characteristic of FIG. 4.

FIG. 6 is a further representation of the digital compensator showing the complex frequency domain (s-plane) diagram of the poles and zeroes according to the invention. The zeroes shown therein have already been described in conjunction with FIG. 4. In MMPZ format, the equation of the compensator according to the invention is given by:

$$D(f) = \frac{K_I/2\pi}{jf} * \frac{<Z_1><Z_2><Z_3><Z_4>}{<P_{1,2,3,4}>^4} \quad (12)$$

where $K_i$ is the integration parameter constant of the compensator 32 (FIG. 1); and the poles and zeroes are as defined in connection with Equation 8, all of which are adjustable in accordance with the invention. The identity with the expressions of FIG. 5a and 5b will be apparent is the form of equation implemented in the controllers depicted in FIG. 5a and in FIG. 5b.

Figure 7A:
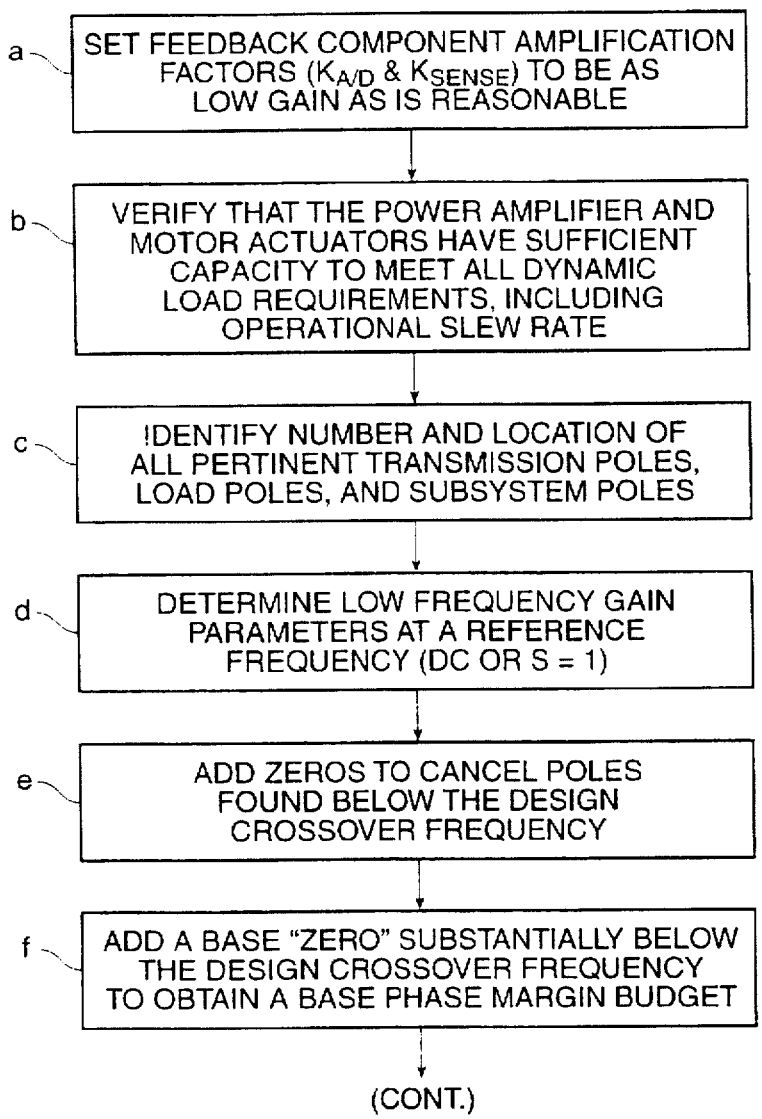
FIG. 7 is a flow chart of a method for setting zero positions in a digital controller according to the invention.
Figure 7B:
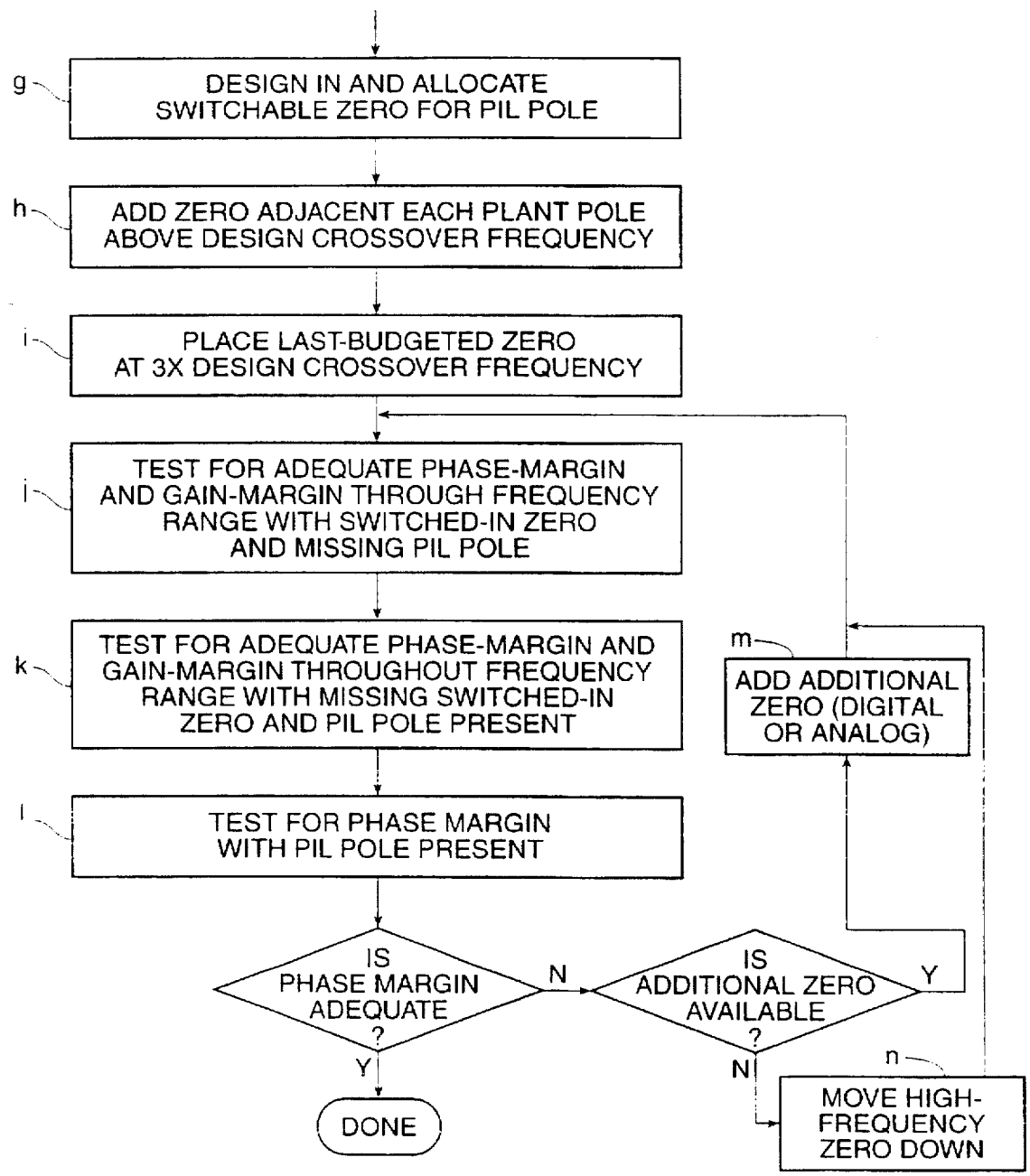

FIGS. 7a and 7b are together a flow chart of a method according to the invention for establishing zero positions in digital and analog compensators according to the invention and for tailoring performance with selected addition of zeroes within the system operating frequency (and inherently paired with poles at substantially above the system operating frequency but at less than 0.3 the clock frequency for digital; less than 10 times that of set zeroes for analog). The method includes, within a typical budget of for example six zeroes:

a) setting feedback component amplification factors ($K_{sense}*K_{A/d}=K_{FB}$) to be as low-gain (coarse) as is reasonable (Step a);

b) verifying that the power amplifier and motor actuators have sufficient capacity to meet all dynamic load requirements, including operational slew rate (Step b);

c) identifying number and location of all pertinent transmission poles, plant (load) poles, and subsystem poles (Step c);

d) determining low frequency gain parameters of all components, except the compensator, at a reference frequency (at DC or at s=1) (Step d);

e) adding zeroes and higher-frequency paired-poles (as part of the compensator) to cancel poles which are found below the design crossover frequency (Frequency for GH=1) (Step e);

f) adding a "base zero", and a higher-frequency paired pole, substantially below the design crossover frequency to obtain a base phase margin budget (Step f);

g) designing in and allocating one switchable zero, and higher-frequency paired pole, at the approximate center frequency of the average (intermittent) PIL pole, so that the zero is switched in whenever the PIL pole is sensed (Step g);

h) adding zeroes at or near each plant pole which is found near or above the design crossover frequency to the extent of zero budget less one (Step h);

i) placing the last-budgeted zero at three times the design crossover frequency to enhance phase margin (Step i);

j) fault-response-testing gain-margin, with the noted phase-margin, where the switched-in zero is active when the PIL pole is absent, to be sure that the loop-gain never exceeds unity (plus some minimum margin) above the set $F_{BW}$, to confirm there is no higher-frequency overshoot (Step j);

k) fault-response-testing the phase-margin with noted gain-margin when the tired, worst-case/lowest frequency PIL pole is present and the switched-in zero is absent to confirm adequate fault phase-margin (Step k); then l) operationally testing for phase-margin (at crossover frequency) with the worst-case PIL pole present ("Tired") to assure that there is substantially no overshoot (Step l);

m) if the phase-margin is inadequate to maintain the phase budget and if an additional zero is within the zero budget, adding an additional zero (Step m) and retesting (Steps j, k, and l) (the budget is limited by the number of zeroes which can be accommodated by the resolution of the digital compensator (its number of bits); and n) if an additional zero is not within the zero budget, shifting one or more of the higher-frequency zeroes which are above the crossover frequency down toward the crossover frequency (Step n), and retesting (Steps j, k, and l).

If absolutely necessary, an analog pole/zero pair can be added in the analog compensator, and the system can be retested (Steps j, k, and l).

Figure 8:
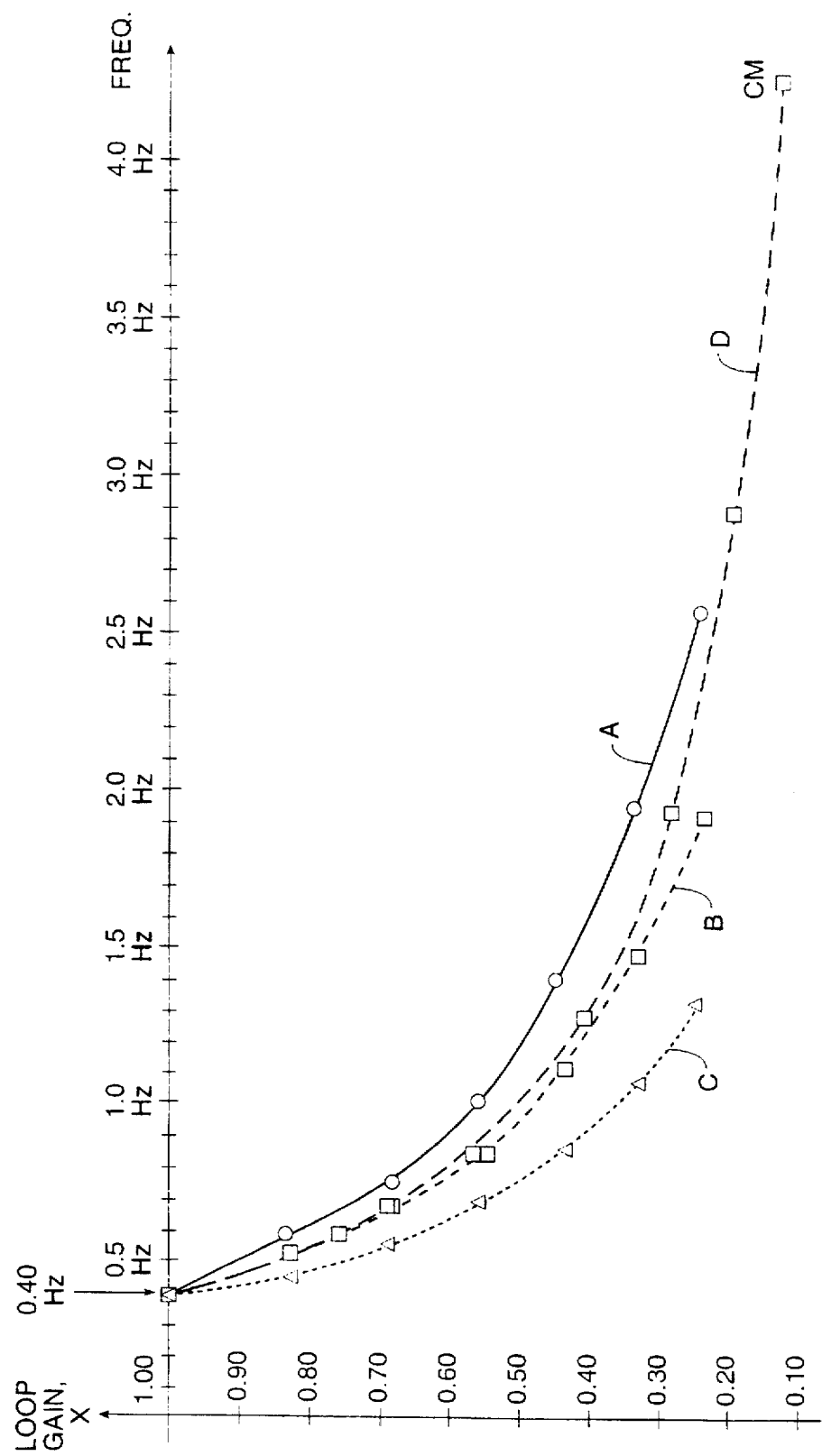
FIG. 8 is a gain-frequency diagram of the loop gain of a loop according to the invention with a potential and actual gain margin associated with and without the pilot in the loop.

FIG. 8 is a gain-frequency diagram showing potential gain margin between 0.4 Hz (the gain crossover frequency) and 4.2 Hz for four types of PIL and non PIL conditions. The loop-gain margin for pilots of "tired" characteristics is trace (C), for "average" response characteristics is trace (B) and "quick" response characteristics is trace (A). In each case the switched-in zero is active. The response characteristic without the pilot in the loop and without the switched-in zero active in accordance with this design is trace (D). This set of diagrams confirms that a design according to the invention assures that the actual or potential gain-margin is adequate for all frequencies of interest above the gain crossover frequency.

The test for gain-margin as performed is a test of the minimum operational gain margin at any frequency above the gain crossover frequency $F_{BW}$ (FIG. 6) to make sure the potential worst-case gain margin at zero slope below the true gain margin does not exceed a minimum operational threshold. (This value is about 5 dB margin below zero dB gain). The test for the gain margin (as defined to be at the zero phase margin point) is to determine if that true gain margin is greater than a benchmark gain threshold. (In practice, this value is about 6.5 dB.) As a rule of thumb, the operational phase-margin minimum in the presence of a worst-case PIL pole should be greater than +70° under all conditions. It is the failure to recognize this important design factor which can lead to serious control deficiencies.

Table II is an example of five conditions showing acceptable and unacceptable closed-loop performance.

TABLE II

| Type | Phase Margin | SRO (%) | CONDITIONS |
|---|---|---|---|
| "FAST" (A) | +93.170° | 0 | PIL |
| "AVG" (B) | +83.363° | 0 | PIL |
| "TIRED" (C) | +71.143° | 0.90 | PIL |
| NOHANDS (D) | +94.241° | 0 | OUT |
| ZERO/"TIRED" | +53.562° | 14.63 | FAULT |
| ZERO/NOHANDS | +119.01° | 0 | FAULT |

This table shows three conditions where a switched-in zero is active, a hands-off condition and two extreme or fault conditions. Phase margin is above 71° in all four cases, and there is no measurable Step Response Overshoot. In the worst case condition, where there is a tired pilot without the switched in zero—which corresponds roughly to a conventional present-day fly-by-wire electronic control system without the switched in zero, or a system according to the invention in which the switched-in zero is fault inactive and a tired pilot is at the controls (i.e., a failure condition by the standards of the present invention)—there is only a 14.63% overshoot. This is much less than half of the overshoot typical of a conventional fly-by-wire control.

Figure 9:
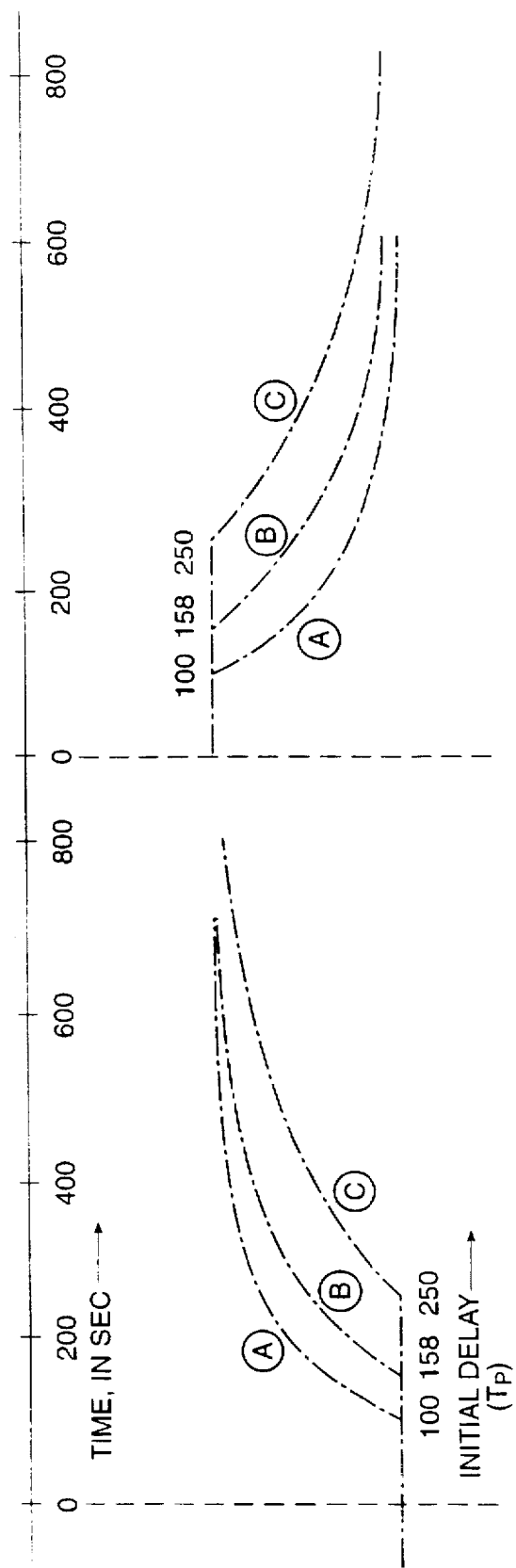
FIG. 9 is a timing diagram illustrating pilot response for a range of pilot types.

FIG. 9 is a timing diagram illustrating pilot response for the same range of pilot types A, B and C of FIG. 8. It shows the typical pilot delay and response to a pair of unit step input perturbations, such as wind gusts.

Figure 10:
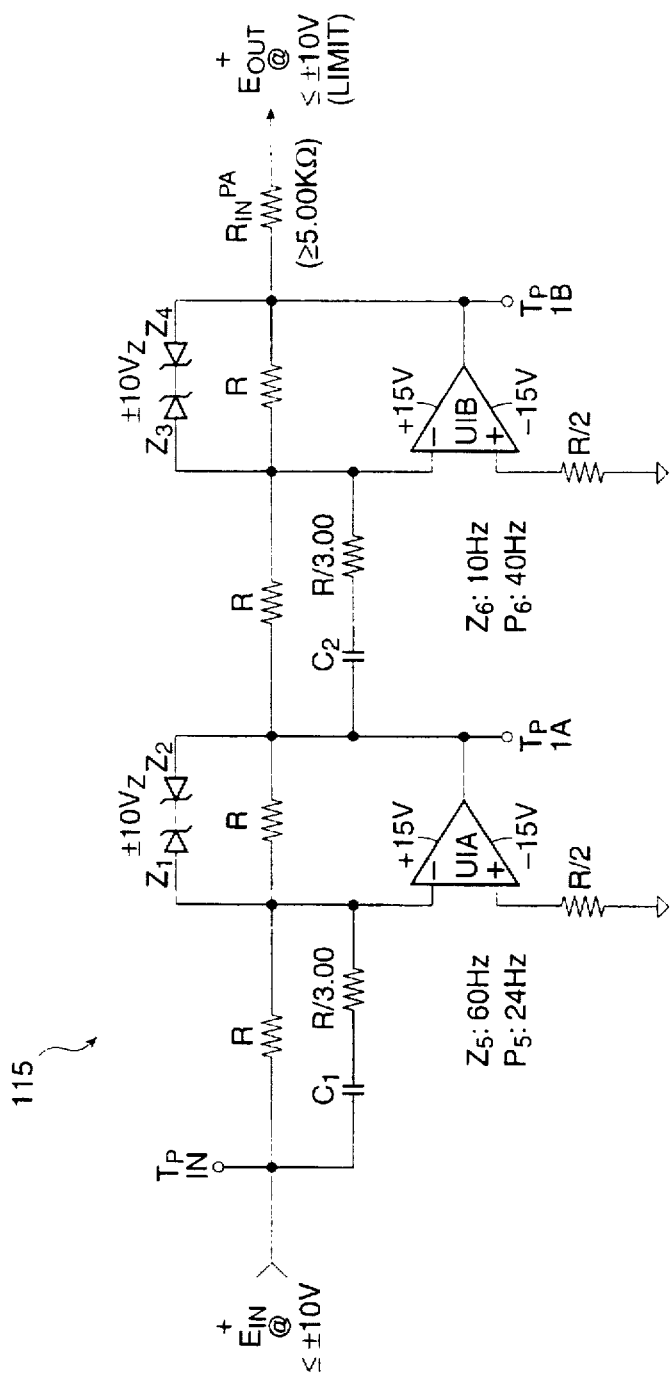
FIG. 10 is a circuit diagram of an analog alternative embodiment for introducing two zero/pole pairs.

FIG. 10 is a circuit diagram of an analog alternative embodiment 115 for introducing two zero/pole pairs. The circuit of FIG. 10 can be incorporated into the analog compensator 15 (FIG. 1) in the event additional zeroes are needed which cannot be provided by the digital compensator 32.

Figure 11:
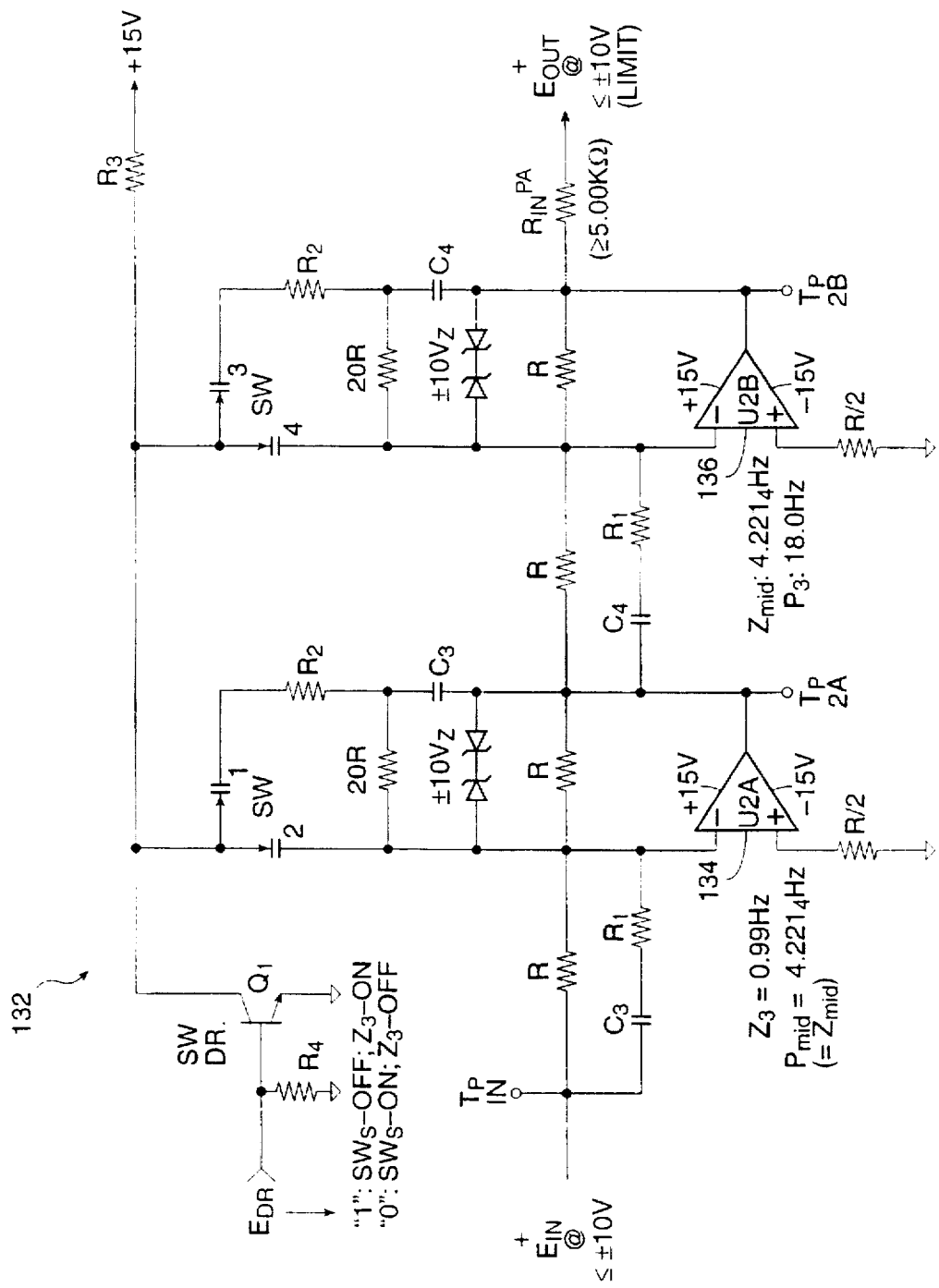
FIG. 11 is a circuit diagram of an analog alternative embodiment for introducing two switched-in zero/pole pairs to create a net single pole/zero pair for compensating for the PIL pole.
Figure 9:
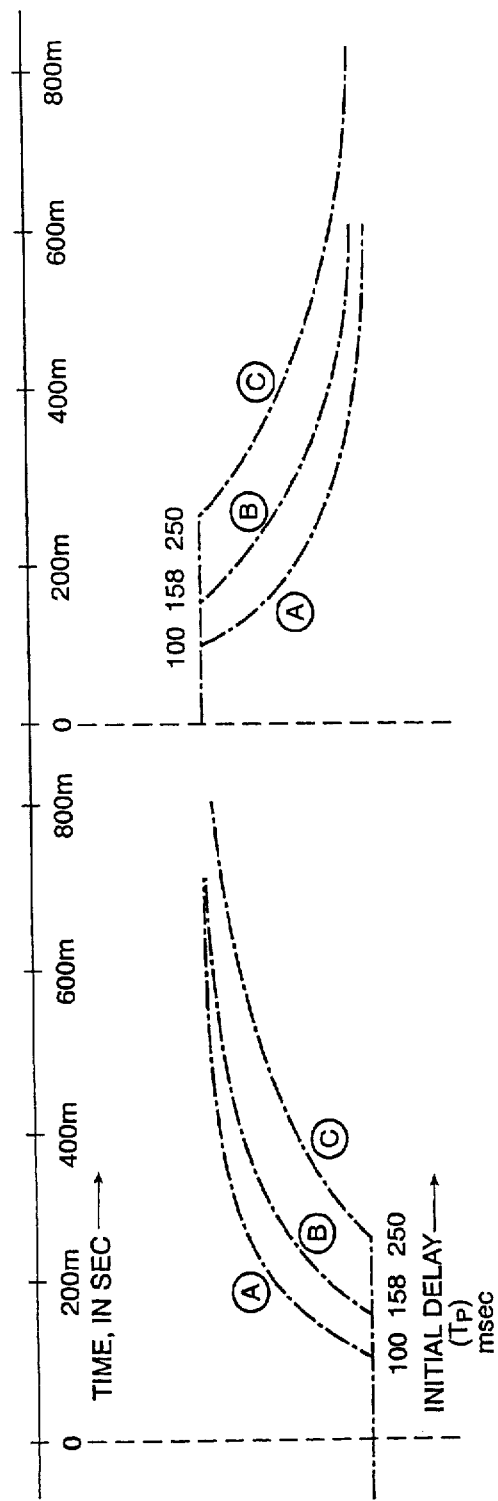

While it is preferred that the switched-in zero be implemented as part of the digital compensator, it is also possible to provide a switched-in zero using analog circuitry. FIG. 11 is a circuit diagram of an analog alternative embodiment 132 for introducing a net single pole/zero pair for compensating for the PIL pole. In actuality, the circuit provides two switched-in zero/pole pairs, one zero mid-frequency cancelling one mid-frequency pole to make a net single pole/zero pair. The structure assures that the output remains in phase with the input and minimizes the pole/zero ratio range in the operational amplifiers 134, 136.

Hardware testing can simulate the foregoing pilot responses. A design can be developed by computer simulation and analytical testing. Relatively simple and inexpensive built-in hardware test capabilities are advantageous to proof-check that the hardware operation matches predicted performance. A simple hardware testing mechanism is a switched-in square-wave generator used with actual control position sensing (on a CRT) to yield rise-time, agility and overshoot (fidelity). This test can be conducted as a part of a pre-flight test.

The invention has now been explained with reference to specific embodiments. Other embodiments will be apparent to those of ordinary skill in the art upon reference to this disclosure. It is therefore not intended that this invention be limited, except as indicated by the appended claims.

What is claimed is:

1. A feedback control system for a use with an operator that is in position to intermittently intervene in the control loop, the feedback system comprising:

means for modeling the operator as a delay in series with an operator pole, said operator delay and pole being introduced in concert upon intervention of the operator;

motor/actuator means coupled to receive a compensated error signal and to drive a load;

position sensor means for generating a position feedback signal representative of said load;

summing junction means coupled to receive a representation of said position feedback signal and an input command signal for generating an error signal from said input command signal and said position feedback signal;

a digital compensator coupled to said summing junction means to receive said error signal and to add compensating zeroes, said digital compensator including input means for receiving a command to add a switchable zero, said switchable zero for compensating for said operator pole wherein said switchable zero in combination with said added zeroes provide a loop phase margin result of at least +70° against a worst case end-of-range operator pole-and-delay and means for coupling said digital compensator to said motor/actuator means to establish said control loop.

2. A feedback control system for a use with an operator that is in position to intermittently intervene in the control loop, the feedback system comprising:

means for modeling the operator as a delay in series with an operator pole, said operator delay and pole being introduced in concert upon intervention of the operator;

motor/actuator means coupled to receive a compensated error signal and to drive a load;

position sensor means for generating a position feedback signal representative of said load;

summing junction means coupled to receive a representation of said position feedback signal and an input command signal for generating an error signal from said input command signal and said position feedback signal;

a digital compensator coupled to said summing junction means to receive said error signal and to add compensating zeroes, said digital compensator including input means for receiving a command to add a switchable zero, said switchable zero for compensating for said operator pole wherein said digital compensator contributes to a loop phase margin result of about +119° with presence of said switchable zero and in absence of said operator pole-and-delay; and means for coupling said digital compensator to said motor/actuator means to establish said control loop.

3. A feedback control system for a use with an operator that is in position to intermittently intervene in the control loop, the feedback system comprising:

means for modeling the operator as a delay in series with an operator pole, said operator delay and pole being introduced in concert upon intervention of the operator;

motor/actuator means coupled to receive a compensated error signal and to drive a load;

position sensor means for generating a position feedback signal representative of said load;

summing junction means coupled to receive a representation of said position feedback signal and an input command signal for generating an error signal from said input command signal and said position feedback signal;

a digital compensator coupled to said summing junction means to receive said error signal and to add compensating zeroes, said digital compensator including input means for receiving a command to add a switchable zero, said switchable zero for compensating for said operator pole wherein said digital compensator contributes to a loop phase margin result of above 80° with said switched-in zero and in presence of said operator pole-and-delay of an average pilot; and means for coupling said digital compensator to said motor/actuator means to establish said control loop.

4. A method for tailoring performance of a control system in which a operator intermittently intervenes to create an operator pole-and-delay, said method comprising selected addition of zeroes by means of a compensator including, within a limited budget of zeroes:

a) setting feedback component amplification factors at low frequency;

b) verifying that power amplifier and motor actuators have sufficient capacity to meet dynamic load requirements, including operational slew rate;

c) identifying number and location of all pertinent transmission poles, plant poles, and subsystem poles;

d) determining low frequency gain parameters of all components, except the compensator, at a reference frequency;

e) adding zeroes to the compensator to cancel poles which are found below the design crossover frequency;

f) adding a "base zero" substantially below the design crossover frequency to obtain a base phase margin budget;

g) designing in and allocating one switchable zero at the approximate center frequency of the average (intermittent) operator pole, so that the zero is switched in whenever the operator pole is sensed;

h) adding zeroes at or near each plant pole which is found near or above the design crossover frequency to the extent of zero budget less a last-budgeted zero;

i) placing the last-budgeted zero at three times the design crossover frequency to enhance phase margin;

j) fault-response testing gain-margin with noted phase-margin for fault response where the switched-in zero is active when the operator pole is absent to be sure that the loop-gain never exceeds unity plus a minimum margin, above the set crossover frequency, to confirm there is no higher-frequency overshoot;

k) fault-response testing the phase-margin with noted gain-margin when the operator pole is present and the switched-in zero is absent to confirm adequate fault phase-margin; then l) operational testing for phase-margin (at crossover frequency) with the worst-case operator pole present to assure that there is substantially no overshoot;

m) if the phase-margin is inadequate to maintain the phase budget and if an additional zero is within the zero budget, adding an additional zero and retesting according to steps j, k, and l; and n) if an additional zero is not within the zero budget, shifting at least one higher-frequency zero which is above the crossover frequency down toward the crossover frequency, and retesting according to steps j, k and l).

5. The method according to claim 4 wherein the compensation function with an integrator has a paired pole for each loop zero added, wherein said paired pole is set at a frequency substantially higher than system operating frequency but not greater than 0.3 of the sampling clock operating frequency, in order to suppress quantization noise, to stay within digital operating limits and boundary conditions, including a negative 1 slope at frequencies greater than 0.3 of the sampling frequency.

6. The method according to claim 4 further comprising providing means for automatically adding the switchable loop zero and an associated paired pole only upon sensing a response of an operator.

7. The method according to claim 4 wherein an analog compensation function has a paired pole for each relatively higher frequency loop zero added, wherein said paired pole is set at a frequency higher than four times the set zero frequency but not greater than ten times the set zero frequency without regard to the sampling clock operating frequency.

8. The method according to claim 4 further including deleting contribution of a low-frequency zero to a first coefficient of a time domain difference equation to effectively cancel present time terms $x(n)$ of low frequency systems.

9. The method according to claim 4, further including assessing bit resolution of said digital compensator to determine capacity for adding compensating zeroes.

10. The method of claim 4 further including representing delay in time in a frequency domain transfer function in the form $|\sin(x)/x|$ at $-x$ degrees, where $x=180°*\text{frequency}*\text{delay}$.

11. The method of claim 4 wherein said delay is fixed for data update.

12. The method of claim 4 wherein said delay is variable to account for characteristics of different operators.

* * * * *

UNITED STATES PATENT AND TRADEMARK OFFICE
CERTIFICATE OF CORRECTION

PATENT NO. : 5,777,871
DATED : July 7, 1998
INVENTOR(S) : William L. Wise

It is certified that error appears in the above-identified patent and that said Letters Patent is hereby corrected as shown below:

In Fig. 9 insert:

--m--after "200," "400," "600" and "800;" --m--after "200," "400," "600" and "800;" and insert --msec--after ($T_p$).

Signed and Sealed this

Twenty-ninth Day of May, 2001

*Attest:*

NICHOLAS P. GODICI

*Attesting Officer*        *Acting Director of the United States Patent and Trademark Office*